United States Patent [19]

Weyland et al.

[11] Patent Number: 5,587,421
[45] Date of Patent: Dec. 24, 1996

[54] MIXTURES CONTAINING WATER-EMULSIFIABLE ISOCYANATES

[75] Inventors: Peter Weyland, Frankenthal; Reinhard Treiber, Leimen; Alwin Sturm, Ludwigshafen; Horst Seibert, Fussgönheim; Hans Renz, Meckenheim; Jürgen Reichert, Ludwigshafen; Karl Häberle, Speyer, all of Germany

[73] Assignee: BASF Aktiengesellschaft, Ludwigshafen, Germany

[21] Appl. No.: 516,923

[22] Filed: Aug. 18, 1995

[30] Foreign Application Priority Data

Aug. 19, 1994 [DE] Germany ............ 44 29 446.8

[51] Int. Cl.⁶ ............ C08J 3/00; C08K 3/20; C08L 75/00; B32B 27/00
[52] U.S. Cl. ............ 524/591; 428/423.1; 524/589; 524/590; 524/839; 524/840; 524/107; 524/110; 524/111; 524/280; 524/284; 524/507; 525/123; 525/455; 528/44
[58] Field of Search ............ 524/589, 590, 524/591, 839, 840, 107, 110, 111, 280, 284, 507; 525/123, 455; 528/44; 428/423.1

[56] References Cited

U.S. PATENT DOCUMENTS

| | | | |
|---|---|---|---|
| 4,499,233 | 2/1985 | Tetenbaum et al. | 524/591 |
| 4,663,377 | 5/1987 | Hombach et al. | 524/196 |
| 4,950,700 | 8/1990 | Balme et al. | 524/111 |
| 5,039,458 | 8/1991 | Braatz et al. | 264/2.6 |
| 5,314,942 | 5/1994 | Coogan et al. | 524/457 |

FOREIGN PATENT DOCUMENTS

| | | |
|---|---|---|
| 0206059 | 12/1986 | European Pat. Off. . |
| 0294984 | 12/1988 | European Pat. Off. . |
| 0310345 | 4/1989 | European Pat. Off. . |
| 3521618A1 | 12/1986 | Germany . |
| 3831169 | 3/1989 | Germany . |

Primary Examiner—Paul R. Michl
Assistant Examiner—Patrick Niland
Attorney, Agent, or Firm—Oblon, Spivak, McClelland, Maier & Neustadt, P.C.

[57] ABSTRACT

A mixture contains
a) water-emulsifiable polyisocyanates and
b) carbonic esters or lactones as organic solvents.

13 Claims, No Drawings

MIXTURES CONTAINING WATER-EMULSIFIABLE ISOCYANATES

The present invention relates to a mixture containing
a) water-emulsifiable polyisocyanates and
b) carbonic esters or lactones as organic solvents.

The present invention furthermore relates to aqueous emulsions which contain the mixtures and to the use of the mixtures as additives for adhesives, coating materials and impregnating materials.

Water-emulsifiable polyisocyanates are added to aqueous polymer dispersions as crosslinking agents. The water emulsifiability is a result of the hydrophilic modification of the polyisocyanates. DE-A-35 21 618 discloses corresponding polyisocyanates which contain polyether groups and are thus water-emulsifiable. In order to reduce the viscosity, organic solvents may be added to the polyisocyanates. DE-A-35 21 618 mentions, for example, ethyl acetate, acetone and methyl ethyl ketone as solvents.

The water-emulsifiable polyisocyanates should be capable of being very finely dispersed in polymer emulsions so that the resulting emulsions have a long shelf life. At the same time, the desired improvements in the properties of the polymer emulsion should be achieved by the addition of very small amounts of the water-emulsifiable polyisocyanates.

It is an object of the present invention to provide water-emulsifiable polyisocyanates which have the above advantages.

We have found that this object is achieved by the mixtures defined above and their use as additives for aqueous polymer emulsions.

The water-emulsifiable polyisocyanates are (cyclo)aliphatic or aromatic diisocyanates or polyisocyanates which have a higher functionality and in some cases are reacted with compounds having at least one hydrophilic group and having at least one group reactive toward isocyanate.

Examples of suitable polyisocyanates are straight-chain or branched $C_4$–$C_{14}$-alkylene diisocyanates, cycloaliphatic diisocyanates having in total 6 to 12 carbon atoms, aromatic diisocyanates having in total 8 to 14 carbon atoms, polyisocyanates containing isocyanurate groups, uretdione diisocyanates, polyisocyanates containing biuret groups, polyisocyanates containing urethane or allophanate groups, polyisocyanates containing oxadiazinetrione groups, uretonimine-modified polyisocyanates or mixtures thereof.

Examples of diisocyanates a) are tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, trimethylhexane diisocyanate and tetramethylhexane diisocyanate, cycloaliphatic diisocyanates, such as 1,4-, 1,3- or 1,2-diisocyanatocyclohexane, 4,4'-di(isocyanatocyclohexyl)methane, 1-isocyanato-3,3,5-tri-methyl-5-(isocyanatomethyl)cyclohexane (isophorone diisocyanate) or 2,4- or 2,6-diisocyanato-1-methylcyclohexane, and aromatic diisocyanates, such as 2,4-diisocyanatotoluene, 2,6-diisocyanatotoluene, tetramethylxylylene diisocyanate, 1,4-diisocyanatobenzene, 4,4'- and 2,4-diisocyanatodiphenylmethane, p-xylylene diisocyanate and isopropenyldimethyltoluylene diisocyanate.

Examples of polyisocyanates are polynuclear homologs of the abovementioned aromatic diisocyanates.

Preference is given to aliphatic or cycloaliphatic polyisocyanates, for example the abovementioned diisocyanates, mixtures thereof or a) Polyisocyanates containing isocyanurate groups and obtained from aliphatic and/or cycloaliphatic diisocyanates. Particularly preferred among these are the corresponding isocyanato isocyanurates based on hexamethylene diisocyanate and isophorone diisocyanate. The present isocyanurates are in particular simple trisisocyanatoalkyl or trisisocyanatocycloalkyl isocyanurates which are cyclic trimers of the diisocyanates, or mixtures with their higher homologs having more than one isocyanurate ring. The isocyanato isocyanurates generally have an NCO content of from 10 to 30, in particular from 15 to 25, % by weight and an average NCO functionality of from 3 to 4.5.

b) Uretdione diisocyanates containing aliphatically and/or cycloaliphatically bonded isocyanate groups, preferably derived from hexamethylene diisocyanate or isophorone diisocyanate. Uretdione diisocyanates are cyclic dimerization products of diisocyanates. The uretdione diisocyanates may be used in the novel formulations as the sole component or as a mixture with other polyisocyanates, in particular those stated under a).

c) Polyisocyanates containing biuret groups and aliphatically bonded isocyanate groups, in particular tris(6-isocyanatohexyl)biuret or mixtures thereof with its higher homologs. These polyisocyanates containing biuret groups generally have an NCO content of from 18 to 22% by weight and an average NCO functionality of from 3 to 4.5.

d) Polyisocyanates containing urethane and/or allophanate groups and aliphatically or cycloaliphatically bonded isocyanate groups, as may be obtained, for example, by reacting excess amounts of hexamethylene diisocyanate or of isophorone diisocyanate with simple polyhydric alcohols, such as trimethylolpropane, glycerol, 1,2-dihydroxypropane or mixtures thereof. These polyisocyanates containing urethane and/or allophanate groups generally have an NCO content of from 12 to 20% by weight and an average NCO functionality of from 2.5 to 3.

e) Polyisocyanates containing oxadiazinetrione groups and preferably derived from hexamethylene diisocyanate or isophorone diisocyanate. Said polyisocyanates can be prepared from diisocyanate and carbon dioxide.

f) Uretonimine-modified polyisocyanates.

The polyisocyanates a) to f) may be used as a mixture, if required also as a mixture with diisocyanates.

For the preparation of the water-emulsifiable polyisocyanates, the polyisocyanates defined above are reacted with compounds which have at least one, preferably one, hydrophilic group and at least one, preferably one, group reactive with isocyanate, for example hydroxyl, mercapto or primary or secondary amino (NH group for short).

The hydrophilic group may be, for example, an ionic group or a group convertible into an ionic group.

Anionic groups or groups convertible into anionic groups are, for example, carboxyl and sulfo groups.

Examples of suitable compounds are hydroxycarboxylic acids, such as hydroxypivalic acid or dimethylol propionic acid, and hydroxy and aminosulfonic acids.

Cationic groups or groups convertible into cationic groups are, for example, quaternary ammonium groups and tertiary amino groups.

Groups convertible into ionic groups are preferably converted into ionic groups before or during dispersing of the novel mixture in water.

In order to convert, for example, carboxyl or sulfo groups into anionic groups, inorganic and/or organic bases, such as sodium hydroxide, potassium hydroxide, potassium carbonate, sodium bicarbonate, ammonia or primary, secondary or in particular tertiary amines, eg. triethylamine or dimethylaminopropanol, may be used.

For converting tertiary amino groups into the corresponding cations, for example ammonium groups, suitable neutralizing agents are inorganic or organic acids, for example hydrochloric acid, acetic acid, fumaric acid, maleic acid, lactic acid, tartaric acid, oxalic acid or phosphoric acid and suitable quaternizing agents are, for example, methyl chloride, methyl iodide, dimethyl sulfate, benzyl chloride, ethyl chloroacetate or bromoacetamide. Further suitable neutralizing and quaternizing agents are described, for example, in U.S. Pat. No. 3,479,310, Column 6.

The content of ionic groups or of groups convertible into ionic groups is preferably from 0.1 to 3 mol per kg of the water-emulsifiable polyisocyanates.

Nonionic groups are, for example, polyalkylene ether groups, in particular those having from 10 to 80 alkylene oxide units. Polyethylene ether groups or polyalkylene ether groups which contain at least 10 ethylene oxide units in addition to other alkylene oxide units, eg. propylene oxide, are preferred.

Examples of suitable compounds are polyalkylene ether alcohols.

The content of hydrophilic nonionic groups, in particular of polyalkylene ether groups, is preferably from 0.5 to 20, particularly preferably from 1 to 15, % by weight, based on the water-emulsifiable polyisocyanates.

The preparation of the water-emulsifiable polyisocyanates is disclosed in DE-A-35 21 618, DE-A-40 01 783 and DE-A-42 03 510.

In the preparation of the water-emulsifiable polyisocyanates, the compounds containing at least one hydrophilic group and at least one group reactive toward isocyanate may be reacted with some of the polyisocyanate, and the resulting hydrophilized polyisocyanates can then be mixed with the remaining polyisocyanates. However, the preparation may also be carried out by adding the compounds to the total amount of the polyisocyanates and then effecting the reaction in situ.

Preferred water-emulsifiable polyisocyanates are those containing hydrophilic, nonionic groups, in particular polyalkylene ether groups. The water emulsifiability is preferably achieved exclusively by the hydrophilic nonionic groups.

The carbonic esters or lactones b) are added to the water-emulsifiable polyisocyanates a) in order to obtain the novel mixture.

The carbonic esters are preferably those of the formula

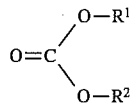

I where $R^1$ and $R^2$ independently of one another are each $C_1$–$C_6$-alkyl, preferably $C_1$–$C_3$-alkyl, or $R^1$ and $R^2$ form a bridge of 2 to 10 carbon atoms. Examples are dimethyl carbonate and diethyl carbonate.

Cyclic carbonic esters, especially those of the formula

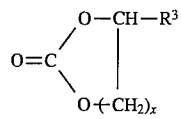

II where $R^3$ is H or $C_1$–$C_5$-alkyl and x may be from 1 to 5, are particularly preferred.

Carbonic esters of the formula II are, for example, 1,2-ethylene carbonate and 1,2-propylene carbonate.

Preferred lactones (cyclic, internal esters of hydroxycarboxylic acids) are those having a total of 3 to 10 carbon atoms.

Examples are β-propiolactone, γ-butyrolactone, ε-caprolactone and ε-methylcaprolactone.

The novel mixture contains preferably from 2 to 70, particularly preferably from 5 to 50, very particularly preferably from 7 to 40, % by weight, based on the sum of a) +b), of the solvent b).

The novel mixture preferably consists only of the components a) and b). It is preferably dispersed in water for the preparation of aqueous emulsions.

The novel mixtures and their aqueous emulsions as such are suitable as coating materials, adhesives or impregnating agents, for example for the treatment of wool, as described in P 4415451.8.

The novel mixture is particularly suitable as an additive, ie. crosslinking agent, for aqueous polymer emulsions. The polymers may be, for example, polyurethane or polymers obtained by free radical polymerization. The mixture is added to the polymer emulsions preferably in amounts of from 0.5 to 20, particularly preferably from 1 to 15, % by weight, based on the polymer (solid).

The aqueous polymer emulsions are used, for example, as adhesives, coating materials or impregnating materials, for example for coloring.

Suitable substrates for use as adhesives or coating materials (finishes, protective coatings) are, for example, plastic, leather, paper, wood or metal.

Substrates for impregnation are, for example, manmade or natural fibers or fabrics thereof.

The novel mixtures can be very finely dispersed in aqueous emulsions. The emulsions obtained have a very long shelf life. Furthermore, a smaller amount of the water-emulsifiable polyisocyanate need be added in order to obtain the desired properties of the emulsion or to achieve said properties during use.

EXAMPLES

Preparation of a nonionic hydrophilized polyisocyanate (according to Example 1 of EP 206 059)

1000 g of a polyisocyanate which is prepared by trimerizing some of the isocyanate groups of 1,6-diisocyanatohexane, contains isocyanurate groups, essentially consists of tris(6-isocyanatohexyl) isocyanurate and the higher homologs thereof and has an NCO content of 22.2%, a monomeric diisocyanate content of less than 0.3%, a viscosity of 1.9 Pas at 23° C. and an average NCO functionality of about 3.3 were heated to 50° C. 80.8 g of a monofunctional polyethylene oxide polyether heated to 50° C. initiated with n-butanol and having a molecular weight of 1120 g/mol were added. The mixture was heated to 110° C. and stirred for 2.5 hours.

After cooling, a clear resin having an NCO content of 18.9% by weight and a viscosity of 2700 mPa.s at 23° C. was obtained.

Example 1

75 g of the polyisocyanate were mixed with 25 g of ethylene carbonate (EC) maintained at 50° C.

Example 2

75 g of the polyisocyanate were mixed with 25 g of propylene carbonate (PC).

Example 3

75 g of the polyisocyanate were mixed with 25 g of γ-butyrolactone (BL).

Example 4

75 g of the polyisocyanate were mixed with 25 g of diethyl carbonate (DC).

Example 5

75 g of the polyisocyanate were mixed with 25 g of ε-caprolactone (CL).

Comparative Example 1

75 g of the polyisocyanate were mixed with 25 g of methoxypropyl acetate (MPA).

Comparative Example 2

75 g of the polyisocyanate were mixed with 25 g of butanone (methyl ethyl ketone, MEK).

Comparative Example 3

75 g of the polyisocyanate were mixed with 25 g of butyl acetate (BAc).

Comparative Example 4

75 g of the polyisocyanate were mixed with 25 g of N-methylpyrrolidone (NMP).

Comparative Example 5

75 g of the polyisocyanate were mixed with 25 g of dimethylformamide (DMF).

Testing of the stability of the emulsion 1 g of each solution was shaken with 99 g of water until everything was emulsified. After 24 hours, the mean particle size was determined.

|  | Solvent | Mean diameter (nm) |
|---|---|---|
| Example |  |  |
| 1 | EC | 90 |
| 2 | PC | 99 |
| 3 | BL | 104 |
| 4 | DC | 101 |
| 5 | Cl | 96 |
| Comparative Example |  |  |
| 1 | MPA | 173 |
| 2 | MEK | 181 |
| 3 | BAc | 560 |
| 4 | NMP | 1432 |
| 5 | DMF | 1693 |

The weight average particle diameter was determined by light scattering measurements using an autosizer 2c from Malvern.

Use Example

Cotton fabric weighing about 120 g/m² was impregnated with an aqueous pigment dyeing liquor having the following composition:

Basic formulation:
10% by weight of Pigment Red C.I. 146
10% by weight of a conventional aqueous polyurethane emulsion as a binder (Perapret® PU from BASF)
an antifoam, a wetting agent, an agent to prevent a film forming on the rolls and an antimigration agent in the conventional amounts
remainder water (to 100% by weight).

The wet pickup was limited to 60% by weight, based on the weight of the gray goods, by means of the squeeze pressure. Drying was then carried out at 100° C.

The fastness to rubbing of the four dyeings obtained was tested according to AATCC DIN 54 021 and rated (rating 1=very poor to rating 5=very good).

Example A (for comparison)

3% by weight of the hydrophilized isocyanate described above were additionally introduced into the dyeing liquor. Rating 3–4.

Example B (for comparison)

3% by weight of a formulation comprising 3 parts of NMP and 7 parts of the hydrophilized isocyanate described above were additionally introduced into the dyeing liquor. Rating 2–3.

Example C

3% by weight of a formulation comprising 3 parts of propylene carbonate and 7 parts of the hydrophilized isocyanate described above were additionally introduced into the dyeing liquor. Rating 3–4.

Example D

3% by weight of a formulation comprising 3 parts of caprolactone and 7 parts of the hydrophilized isocyanate described above were additionally introduced into the dyeing liquor. Rating 3–4.

It is evident that the dyeing achieved in Examples 1 and 2 is just as good as that in Example A, although only 70% of the active ingredient were used.

If, on the other hand, NMP is used (Example B), a substantially poorer dyeing is obtained.

We claim:

1. An aqueous polymer emulsion comprising a crosslinkable polymer, and as a crosslinking agent for said polymer, 0.5 to 20% by weight, based on the weight of the polymer, of a mixture containing a) a water-emulsifiable polyisocyanate containing ionic group or groups convertible into ionic groups or containing hydrophilic nonionic groups, and b) a carbonic ester or lactone as an organic solvent.

2. The composition as claimed in claim 1, containing from 2 to 70% by weight of the compounds b), based on the sum a)+b).

3. The composition as claimed in claim 1, wherein a) are polyisocyanates containing polyalkylene ether groups.

4. The composition as claimed in claim 3, wherein a) are polyisocyanates containing polyethylene ether groups.

5. The composition as claimed in claim 1, wherein the content of ionic groups or groups convertible into ionic groups is from 0.1 to 3 mol per kg of water-emulsifiable polyisocyanates.

6. The composition as claimed in claim 3, wherein the content of the polyalkylene ether groups is from 0.1 to 30% by weight, based on the water-emulsifiable polyisocyanates.

7. The composition as claimed in claim 1, wherein a) comprises aliphatic polyisocyanates.

8. The composition as claimed in claim 1, wherein the carbonic esters are those of the formula

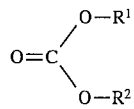   I where $R^1$ and $R^2$ independently of one another are each $C_1$–$C_6$ alkyl or $R^1$ and $R^2$ together form a bridge of 2 to 10 carbon atoms.

9. The composition as claimed in claim 1, wherein the carbonic esters are those of the formula

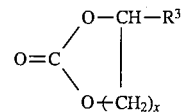   II where $R^3$ is H or $C_1$–$C_5$-alkyl and x may be from 1 to 5.

10. The composition as claimed in claim 1, wherein the lactones are β-propiolactone, γ-butyrolactone, ε-caprolactone or ε-methyl-caprolactone.

11. The composition of claim 1, wherein the crosslinkable polymer is a polyurethane or a polymer obtained by free radical polymerization.

12. An adhesive, coating material, or impregnating material based on the aqueous emulsion of claim 1.

13. A coated, impregnated or adhesively bonded substrate which has been coated, impregnated, or adhesively bonded with the aqueous emulsion of claim 1.

* * * * *